(12) United States Patent
Albert et al.

(10) Patent No.: US 9,477,007 B2
(45) Date of Patent: Oct. 25, 2016

(54) LASER SCANNER

(71) Applicant: SICK AG, Waldkirch/Breisgau (DE)

(72) Inventors: Magnus Albert, Freiburg (DE);
Michael Engler, Sexau (DE); Joachim Kramer, Freiburg (DE)

(73) Assignee: SICK AG, Waldkirch/Breisgau (DE)

( * ) Notice: Subject to any disclaimer, the term of this patent is extended or adjusted under 35 U.S.C. 154(b) by 38 days.

(21) Appl. No.: 14/055,924

(22) Filed: Oct. 17, 2013

(65) Prior Publication Data
US 2014/0111805 A1    Apr. 24, 2014

(30) Foreign Application Priority Data
Oct. 19, 2012    (EP) .................................... 12189241

(51) Int. Cl.
*G01V 8/10* (2006.01)
*G01S 17/93* (2006.01)
*G01S 7/499* (2006.01)

(52) U.S. Cl.
CPC ................. *G01V 8/10* (2013.01); *G01S 7/499* (2013.01); *G01S 17/93* (2013.01)

(58) Field of Classification Search
CPC .......... G01S 17/93; G01S 7/499; G01V 8/10
See application file for complete search history.

(56) References Cited

U.S. PATENT DOCUMENTS

| | | | | |
|---|---|---|---|---|
| 4,572,662 A | * | 2/1986 | Silverman ............. | G01S 7/4812 356/141.4 |
| 4,786,126 A | * | 11/1988 | Kramer ............................ | 359/18 |
| 4,931,767 A | * | 6/1990 | Albrecht .................. | B60Q 9/00 340/425.5 |
| 5,118,180 A | * | 6/1992 | Wichmann et al. ......... | 356/5.05 |
| 5,200,597 A | * | 4/1993 | Eastman et al. ............... | 235/455 |
| 5,206,698 A | * | 4/1993 | Werner et al. ............... | 356/5.05 |

(Continued)

FOREIGN PATENT DOCUMENTS

DE  40 16 973 C1  6/1991
DE  43 40 756 A1  6/1994

(Continued)

OTHER PUBLICATIONS

European Search Report in the Counterpart Application No. 12189241.8, dated Jan. 17, 2013, with English Translation, seven (7) pages.

*Primary Examiner* — Kara E Geisel
*Assistant Examiner* — Dominic J Bologna
(74) *Attorney, Agent, or Firm* — Nath, Goldberg & Meyer; Jerald L. Meyer

(57) ABSTRACT

A laser scanner, in particular a safety laser scanner, in accordance with the operating principle of the time of flight process, comprising a light transmission unit having at least one light transmitter for transmitting a polarized transmitted light beam into a monitored zone; a light reception unit having at least one light receiver for detecting the polarization component of the light reflected in the monitored zone being orthogonal to the polarization direction of the transmitted light beam, and/or the polarization component of the light reflected in the monitored zone being parallel to the polarization direction of the transmitted light beam, and for generating a received signal corresponding to the detected orthogonal polarization component and/or the detected parallel polarization component; and an evaluation unit configured to evaluate the time development of the detected orthogonal polarization component and/or of the detected parallel polarization component.

17 Claims, 2 Drawing Sheets

(56) References Cited

U.S. PATENT DOCUMENTS 5,289,265 A * 2/1994 Inoue ................. G01B 11/0616
356/632
7,580,127 B1 * 8/2009 Mayor ................... G01N 21/21
356/337

2007/0279615 A1 12/2007 Degnan et al.

FOREIGN PATENT DOCUMENTS

| | | |
|---|---|---|
| DE | 43 35 244 B4 | 10/2006 |
| GB | 1 113 888 A | 5/1968 |

* cited by examiner

LASER SCANNER

BACKGROUND

Technical Field

The present invention relates to a laser scanner, in particular to a safety laser scanner, in accordance with the operating principle of the time of flight process for detecting objects in a monitored zone.

The presence and the distance of objects can be determined in accordance with the known principle of the time of flight process using laser scanners. For this purpose, either a brief light pulse is transmitted and the time until the reception of a reflection of the light pulse is measured in a pulse transit time process or transmitted light is amplitude-modulated and a phase shift between the transmitted light and the received light is determined in a phase process, with the phase shift likewise being a measure for the time of flight.

Safety laser scanners such as are known, for example, from DE 43 40 756 A1 are frequently used for monitoring work areas. A light beam generated by a laser is directed via a light deflection unit into a protected zone and is remitted there by an object which may be present. At least some of the remitted light again returns to the laser scanning unit and is detected by a receiver there. The light deflection unit is designed to be pivotable or rotatable as a rule such that the light beam generated by the laser periodically sweeps over a protected field generated by the pivot movement or rotational movement. If a light signal remitted by an object is received from the protected zone, a conclusion can be drawn on the angular location of the object in the protected zone from the angular position of the deflection unit. If the transit time of individual laser light pulses is, for example, additionally monitored from the transmission up to the reception of a reflection at the object, it is additionally possible to draw a conclusion on the distance of the object from the laser scanner from the transit time using the speed of light. The location of the object can be determined using the data on angle and distance and the scan plane swept over by the light beam can be completely monitored. If an unpermitted object is located in the scan plane, a corresponding warning signal or stop signal can be output by the evaluation unit of the scanner.

Such systems are used, for example, at machines in which a danger zone has to be monitored which may not be entered by an operator during the operation of the machine. If an unpermitted object—that is, for example, a leg of an operator—is found in the danger zone with the aid of the laser scanner, an emergency stop of the machine is effected. Such scanning system as safety sensors have to operate reliably and must therefore satisfy high safety demands, for example the standard EN 13849 for the safety of machinery, and in particular the standard EN 61496 for electrosensitive protective equipment (ESPE), with the standard EN 61496 currently only covering the indoor area.

A number of measures have to be taken to satisfy these safety standards such as reliable electronic evaluation by redundant, diverse electronics, function monitoring by, for example, monitoring the soiling of optical components, in particular of a front screen, and/provision of individual test targets with defined degrees of reflection which have to be recognized at the corresponding scanning angles.

Such safety laser scanners are also used at so-called DTS ("driverless transport systems") to prevent these transport systems from colliding with objects such as persons that cross their route.

In the indoor area in which no sight interference occurs from the outside, the named measured are sufficient to satisfy the safety standards. The use of safety scanners has previously been very problematic in the outdoor area. The useful optical power is reduced by an unknown degree, and thus the detection reliability is reduced, by rain, fog, snow, air pollution such as dust, and the like. In the following, the water drops, snow crystals and dust particles which form rain, fog, snow and air pollution will also be called "soft objects". The reduction of the optical performance to an unknown degree results in an unpredictable erroneous response of the scanner, for example due to transmitted radiation which is reflected at the soft objects and is interpreted as an "object in the protected zone" by the scanner as soon as the backscattered signal is above an assessment threshold.

A further disadvantage in the outdoor area is that, when soft objects appear, the transmitted radiation is damped to an unknown degree and the visual range is thus reduced to an unknown degree so that objects may admittedly possibly be present in the protected zone, but are not recognized because the light intensity which ultimately reaches the receiver is too low. A general difficulty is shown here which underlies the scanning measurement principle of the laser scanner in the satisfying of the safety demands. The scanner namely releases a dangerous movement of a machine when no signal is received from the protected field and the machine is only stopped when an object is detected in the protected field and consequently light is received. Poor visibility can thus also produce the result "no light—protected field free", which must be prevented. This is one of the main reasons why safety laser scanners have previously hardly been used in outdoor applications. Since DTS absolutely require collision protection, the outdoor use of a DTS is very restricted.

To cope with the problem of soft objects, external reference targets which the laser scanner has to "see" have previously been used in outdoor uses of laser scanners. The use of external targets is, however, not only very complex and/or expensive, since the targets have to be provided, on the one hand, and the targets have to be programmed into the laser scanner, on the other hand. It is also practically not possible to use external targets in DTS applications since ultimately the DTS moves with the laser scanner so that the external test targets are always seen at a different distance and direction starting from the laser scanner and a sensible evaluation is therefore not possible.

The document DE 43 35 244 B4 relates to a camera system to improve visibility in a vehicle. The light transmitted by a lighting unit and reflected is received by a camera and presented as an image. The light transmitted by the lighting unit is linearly polarized. A dazzling of the camera by light scattered back at rain or fog can be reduced by a polarization filter standing perpendicular to the polarization of the transmitted light in front of the camera.

SUMMARY OF INVENTION

It is the underlying object of the invention to provide a laser scanner of the initially named kind which is suitable for outdoor use, with it being possible to dispense with external reference targets.

This object is satisfied by a laser scanner having the features of claim 1, and in particular by a laser scanner in accordance with the operating principle of the time of flight process for detecting objects in a monitored zone, comprising a light transmission unit having at least one light transmitter for transmitting a polarized transmitted light beam into the monitored zone; a light reception unit having at least one light receiver for detecting the polarization component of the light reflected in the monitored zone which is orthogonal to the polarization direction of the transmitted light beam, and/or for detecting the polarization component of the light reflected in the monitored zone which is parallel to the polarization direction of the transmitted light beam, and for generating a received signal corresponding to the detected orthogonal polarization component and/or for generating a received signal corresponding to the detected parallel polarization component; and comprising an evaluation unit which is configured to evaluate the time curve of the received signal of the detected orthogonal polarization component and/or to evaluate the time curve of the received signal of the detected parallel polarization component, in particular to detect objects present in the monitored zone.

The laser scanner has in a manner known per se a light deflection unit with which a light beam generated by a laser is directed into a protected monitored zone so that the light sweeps over the monitored region. A laser, e.g. a semiconductor diode laser, is used as the light transmission unit.

Polarized light which is incident onto objects having an at least substantially diffusely reflecting surface at least largely loses its polarization. This is not the case, in contrast, on reflection at fog, rain and the like. It is therefore possible to distinguish between a reflection at objects to be detected in the sense of the present invention, i.e. between real or hard objects such as body parts, machine parts, walls, pillars or the like, on the one hand, and a reflection at fog, rain or the like, on the other hand, whose droplets, drops or particles can also be called soft objects, in particular having diameters in the order of magnitude of the light wavelength, via the evaluation of the polarization information of the backscattered light. Hard objects are generally safety-critical in safety applications and have to be recognized. The presence of soft objects is generally uncritical, i.e. does not signify any risk.

The invention is therefore ultimately based on the physically fundamentally different processes which underlie the backscattered received signals. Objects to be detected in the sense of the present invention show a scattering behavior for incident light which can be approximately described by the theory of Lambert scattering. In Lambert scattering, the transmitted light is no longer polarized after the polarization, but rather contains all polarization directions. External disturbance phenomena such as fog or the like, in contrast, show a scattering behavior which can best be described by the Mie theory. The polarization of the transmitted light is also maintained here after a reflection.

Light reflected at objects to be detected is accordingly largely unpolarized so that a large portion of this light, in particular e.g. approximately 50%, is also contained in the received signal of the detected orthogonal polarization component. Light scattered back at external disturbance phenomena such as fog or the like, in contrast, is polarized in the direction of the original polarization of the transmitted light beam.

In accordance with the invention, the polarization component of the reflected light which is orthogonal to the polarization direction of the transmitted light beam therefore does not contain any share, or only a comparatively small share, of light reflected at disturbance phenomena. The ratio of the actual useful signal, i.e. of the portion based on a reflection at an object, to an interference signal, i.e. the portion which is based on a reflection at a disturbance phenomenon, in the received signal of the detected orthogonal polarization component can therefore be increased. Objects can thus be better differentiated from simple disturbance phenomena at least in the received signal of the detected orthogonal polarization component. A significant signal portion which originates from light reflected at external disturbance phenomena can also be contained In the curve of the received signal of the detected parallel polarization component in addition to a signal portion which originates from light reflected at an object.

An object detection can therefore still also take place under visibility conditions in which it is already no longer possible using laser scanners known from the prior art, and indeed without an external test target being required for this purpose, said object detection taking place from the curve of the received signal of the detected orthogonal polarization component of the reflected light and independently of the polarization component of the reflected light which is parallel to the polarization direction of the transmitted light beam or optionally while taking additional account of the curve of the received signal of the parallel component of the reflected light. In accordance with the invention, interference signals based on external phenomena can therefore be at least largely masked. This opens up the realization of mobile outdoor applications.

Alternatively or additionally, the evaluation unit can be configured to distinguish portions which are based on the reflection at an object from portions which are based on a reflection at disturbance phenomena in at least one of the two received signal curves, in particular in the received signal curve of the detected parallel polarization component.

The polarization component of the light reflected in the monitored region which is orthogonal to the polarization direction of the transmitted light beam is to be understood as the polarization component whose direction is oriented perpendicular, at least substantially perpendicular, to the polarization direction of the transmitted light beam. In addition, a polarization component can also additionally be understood by this whose direction dies not differ by a full 90° from the polarization direction of the transmitted light beam, but rather only by more than 45°, in particular by 60° or more, with the increase in the aforesaid ratio of useful signal to interference signal, however, being correspondingly smaller in dependence on the respective angle. The polarization component of the light reflected in the monitored region which is parallel to the polarization direction of the transmitted light beam is to be understood as the polarization component whose direction is oriented parallel, at least substantially parallel, to the polarization direction of the transmitted light beam. In addition, it can also be understood as a polarization component whose direction differs by less than 45° from the polarization direction of the transmitted light beam, in particular by 30° or less.

The polarized transmitted light beam is a transmitted light beam having a defined polarization. The polarized transmitted light beam can in particular be a linearly polarized transmitted light beam or a circularly polarized transmitted light beam.

For the case of circularly polarized transmitted light, the orthogonal polarization component of the reflected light in the sense of the present application is that polarization component which has the direction of rotation opposite to the direction of rotation of the transmitted light beam and the parallel polarization component of the reflected light has the same direction of rotation as the transmitted light beam. With a specular reflection of circularly polarized light at an object, the direction of rotation of the polarization of the light is reversed or rotated; with a diffuse reflection or remission, the polarization is lost.

The polarized transmitted light beam can be generated directly with the aid of a correspondingly designed light transmitter or with the aid of a filter interposed downstream of the light transmitter in the propagation direction of the transmitted light or with the aid of any other suitable optical component.

To detect the polarization component of the light reflected in the monitored zone which is orthogonal to the polarization direction of the transmitted light beam, the light reception unit can comprise a polarization filter which is arranged in front of the at least one light receiver in the direction of propagation of the reflected light and which is aligned orthogonal to the polarization direction of the transmitted light beam. The detection of a polarization component of the reflected light which is parallel to the polarization direction of the reflected light is then as a rule no longer possible—without further measures.

To detect the polarization component of the light reflected in the monitored zone which is parallel to the polarization direction of the transmitted light beam, the light reception unit can comprise a polarization filter which is arranged in front of the at least one light receiver in the direction of propagation of the reflected light and which is aligned parallel to the polarization direction of the transmitted light beam. The detection of a polarization component of the reflected light which is orthogonal to the polarization direction of the reflected light is then as a rule no longer possible—without further measures.

The evaluation unit can be configured to recognize different maxima and/or different flank gradients in at least one of the two curves, in particular in the reception signal curve of the detected parallel polarization component, in particular to distinguish portions which are based on a reflection at an object from portions which are based on a reflection at disturbance phenomena.

The evaluation unit can also be configured to evaluate the two curves together, in particular to compare them with one another.

The evaluation unit can in particular be configured to recognize interference signals caused by external influences in at least one of the two curves and/or to recognize a visibility impairment. A comparison of the two curves can, for example, have the result that the time curve of the received signal of the parallel polarization component at a specific time or within a specific time interval has a maximum which does not occur or which only occurs in attenuated form in the time curve of the received signal of the orthogonal polarization component from which a visibility disturbance can be concluded. Furthermore, to obtain a ratio of useful signal to interference signal which is as high as possible, the evaluation whether an object is present in the monitored zone can be based on a received curve combined from the two received curves for which combined received curve the two received signals are added to one another in regions in which a sufficiently formed maximum occurs in both received signals and only the received signal of the orthogonal polarization component is used in regions in which a maximum at least substantially only occurs in the received signal of the parallel polarization component.

Furthermore, the evaluation unit can be configured to determine a value for a light damping, a light absorption and/or an in particular atmospheric visual range in dependence on the evaluation of at least one of the two curves, in particular in dependence on the characteristic of a maximum occurring at least substantially only in the received signal of the parallel polarization component. This can take place, for example, by a comparison of the level of a maximum only occurring in the received signal of the parallel polarization component with the optionally added level of a maximum occurring in both received signals.

Additionally or alternatively, the evaluation unit can be configured to set the luminous intensity or the signal dynamics of the transmitted light beam in dependence on the evaluation of at least one of the two curves. If it is found that a visibility impairment is present, the transmission power of the light transmission unit can be increased in accordance with the degree of the visibility impairment to ensure that light scattered back from the object to be detected can still sufficiently reach the light reception unit despite the damping of the transmitted and reflected light. The interference signal in the received signal curves caused by the visibility impairment and increased accordingly can in this respect be masked as explained above. In addition to the suppression of the interference signal caused by a visibility impairment, the damping effect on the transmitted and reflected light associated with the visibility impairment can thus also be compensated.

To detect both the polarization component of the reflected light which is orthogonal to the polarization direction of the transmitted light beam and to detect the polarization component of the reflected light which is parallel to the polarization direction of the transmitted light beam, the light reception unit can comprise a polarization beam splitter which is arranged in front of the at least one light receiver in the propagation direction of the reflected light and which splits the reflected light into the orthogonal polarization component and into the parallel polarization component.

In accordance with another embodiment of the invention, the light transmission unit comprises two light transmitters which are each configured to transmit a polarized transmitted light beam into the monitored zone. In this respect, only the polarization component which is orthogonal to the polarization direction of the transmitted light beam is evaluated or only the polarization component which is parallel to the polarization direction of the transmitted light beam is evaluated or both polarization components can be evaluated as has been respectively described above. The object detection and/or the visibility impairment detection can hereby be designed even more sensitively and/or more robustly. It is of advantage in this respect if the polarization directions of the two transmitted light beams are aligned orthogonally to one another and/or if the wavelength and/or the frequency spectrum of the two transmitted light beams is/are identical. Problems which could arise due to different reflectivities of different wavelengths can hereby be avoided.

The at least one light receiver can be configured as a spatially resolving light receiver, can have two reception zones spatially separate from one another and/or can have two separate light receivers to detect the orthogonal polarization component of the reflected light and the parallel polarization component of the reflected light independently of one another.

The present invention furthermore relates to a method of detecting objects in a monitored zone, wherein a polarized transmitted light beam is transmitted into the monitored zone, the polarization component of the light reflected from the monitored zone which is orthogonal to the polarization direction of the transmitted light beam and/or the polarization component of the light reflected in the monitored zone which is parallel to the polarization direction of the transmitted light beam is/are detected and/or a received signal corresponding to the detected orthogonal polarization component and/or a received signal corresponding to the detected parallel polarization component is/are generated and the time curve of the received signal of the detected orthogonal polarization component and/or the time curve of the received signal of the detected parallel polarization component is/are evaluated, in particular to detect objects present in the monitored zone.

Preferred embodiments of the method in accordance with the invention result in an analog manner from the further developments of the laser scanner in accordance with the invention.

Advantageous embodiments of the invention are set forth in the dependent claims, in the description and in the drawing.

A non-restricting embodiment of the invention is represented in the drawing and will be described in the following.

DETAILED DESCRIPTION

A safety laser scanner described in the following serves, for example, for monitoring for unauthorized access into a monitored zone or for monitoring the region in front of an autonomously driving vehicle. If an unpermitted object, for example the leg of an operator, is located in the monitored zone, this is detected by the described scanner and a safety signal, which can be a warning signal or a switching-off signal, can be output and corresponding measures are initiated which prevent the danger, e.g. the movement of the machine causing danger is stopped or at least braked.

The term "unauthorized object" is used in the present text for unauthorized objects in the protected field which have to be detected to prevent a danger, e.g. a collision. Endangered body parts of operators can in particular be meant by it, for example.

Figure 1:
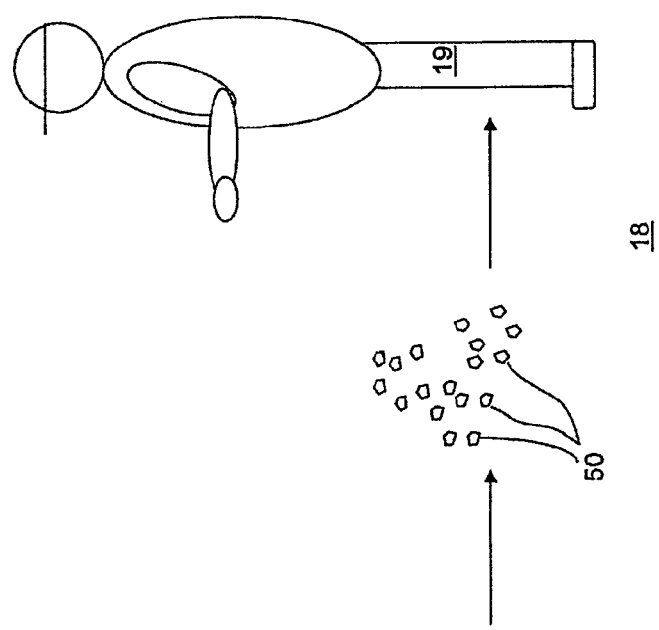
FIG. 1 a schematic representation of a laser scanner in accordance with the invention and its operating principle.
Figure 1:
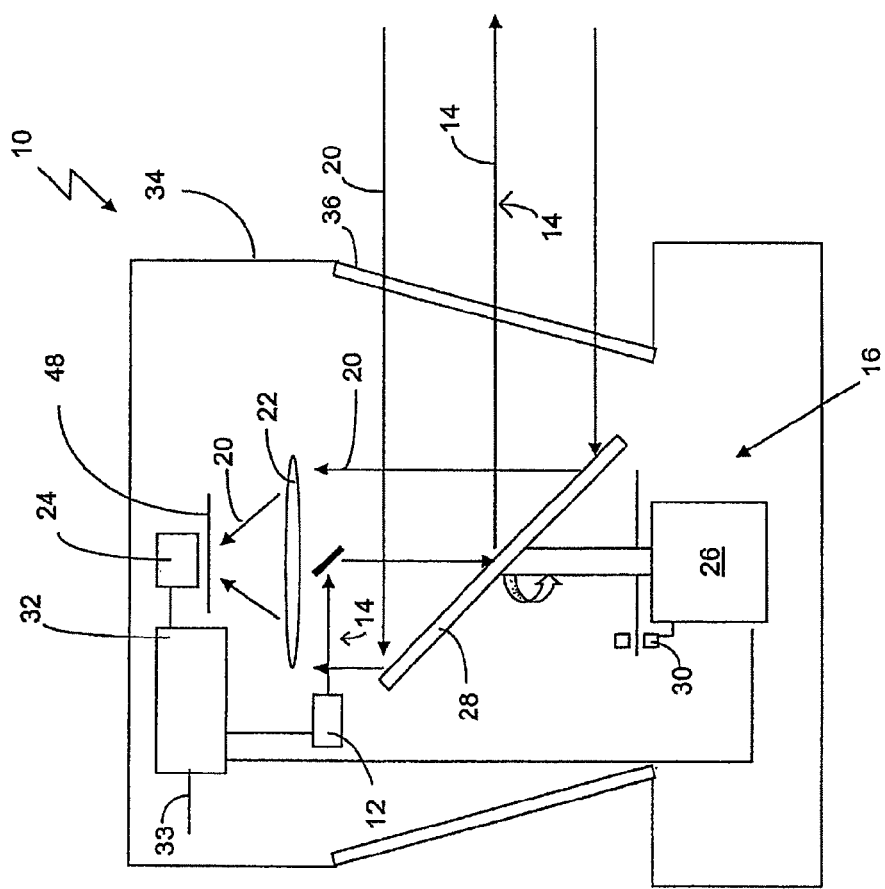

FIG. 1 schematically shows the design of an embodiment of a safety laser scanner 10. A laser light beam 14 which is generated by a light transmitter 12 of a light transmission unit and which comprises individual light pulses is directed via a light deflection unit 16 into a field of vision including a monitored zone 18 and is there remitted by an object 19 which may be present. The field of vision comprises the whole aperture angle of the scanner 10. Remitted light 20 arrives back at the laser scanner 10 again and is there detected by a light receiver 24 via the deflection unit 16 and by means of an optical receiving system 22. The light deflection unit 16 is made rotatable as a rule, with a motor 26 continuously rotating a rotating mirror 28. The respective angular position of the rotating mirror 28 is detected via an encoder 30. The light beam 14 generated by the light transmitter 12 thus sweeps over the field of vision which is generated by the rotational movement and in which the monitored zone 18 is located. If a reflected light signal 20 received by the light receiver 24 is received from the field of vision 18, a conclusion can be drawn on the angular location of the object in the field of vision 18 from the angular position of the deflection unit 16. In addition, the transit time of the individual laser light pulses of the transmitted light 14 is monitored from the transmission up to the reception of a reflection at the object and a conclusion is drawn on the distance of the object from the laser scanner 10 from the time of flight while using the speed of light. The position of the measured reflection is this determined in polar coordinates.

This evaluation takes place in an evaluation unit 32 which is connected for this purpose to the light transmitter 12, to the light receiver 24, to the motor 26 and to the encoder 30. The location of the object 19 can be determined using the data on the angle and distance and the monitored zones 18 can be completely monitored in this manner. The dimensions of the monitored zone 18 are defined by corresponding parameters which are stored in a memory in the evaluation unit 32. If an unauthorized object 19 is located in the monitored zone 18, a corresponding object detection signal can be output by the evaluation unit 32 to an output of the laser scanner 10 via a line 33 and thus ultimately a safety signal can be output to bring about a stop of a machine causing danger, for example.

All the named functional components are arranged in a housing 34 which has a front screen 36 at the front side, that is in the region of the light exit and of the light entry. The front screen 36 is set obliquely for the avoidance of direct reflections into the receiver so that the angle between the light beam 14 and the front screen 36 amounts to unequal to 90°.

What is described here explains the basic principle and the basic design of a laser scanner with an additional evaluation of the time of flight. The safety laser scanner in accordance with the invention now comprises further features and properties which allow an outdoor use.

In accordance with the invention, the light transmission unit is designed e.g. such that the light transmitter 12 of the light transmission unit transmits transmitted light beams 14 which are linearly polarized. Furthermore, the light 20 reflected in the monitored zone 18 and returning to the laser scanner 10 is split by means of a polarization beam splitter 48 into a polarization component which is orthogonal to the polarization direction of the transmitted light beam 14 and into a polarization component which is parallel to the polarization direction of the transmitted light beam 14, with the two polarization components being incident on the light receiver 24 spatially separate from one another and being detected independently of one another there.

The polarized light can e.g. be generated using a correspondingly polarized laser diode or by interposing a polarization filter upstream.

Figure 2:
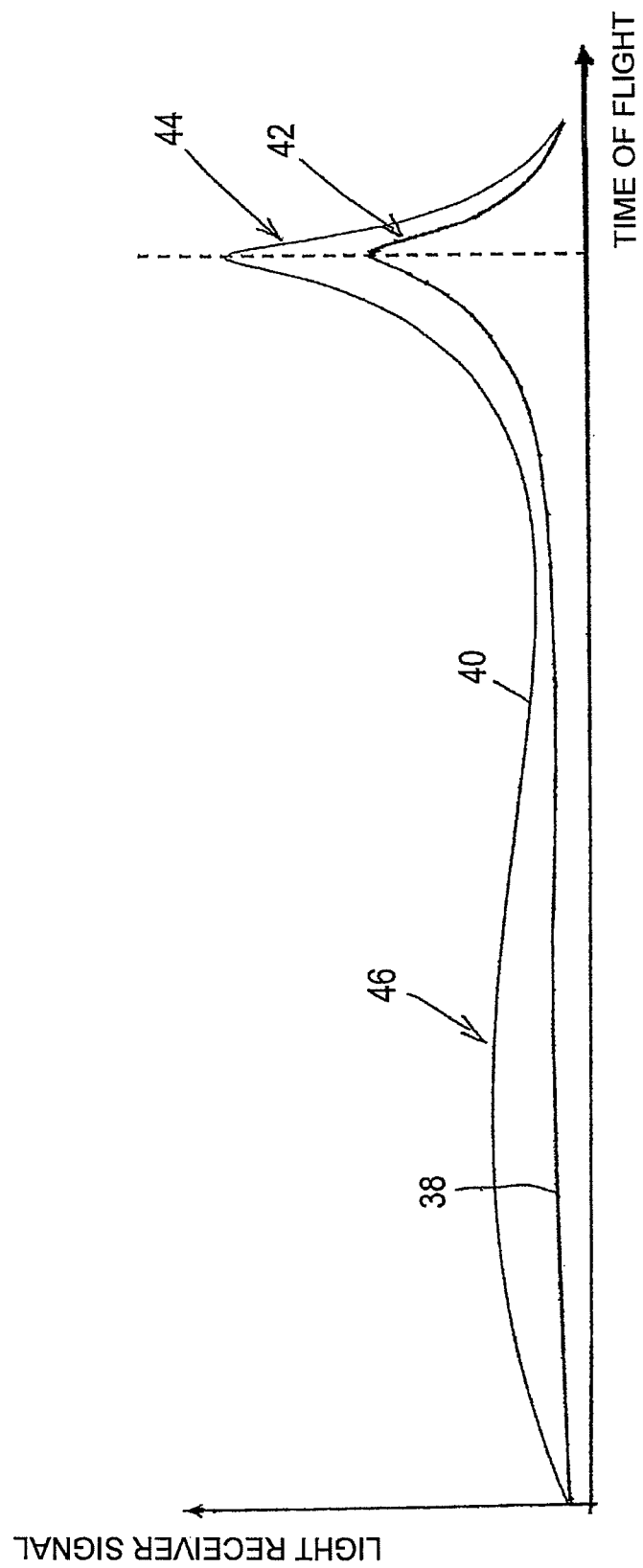
FIG. 2 diagrams of typical curves of two polarization components of light reflected in the monitored zone of the laser scanner.

In FIG. 2, corresponding associated orthogonal and parallel received signals 38 and 40 of the reflected light 20 are shown which are generated by the light receiver 24. A received signal curve 38, 40 results when a laser pulse is transmitted at the time t=0 and the received signal is entered over the time. The two shown received signals 38, 40 in this respect reproduce typical curves such as arise in a situation which is shown by way of example in FIG. 1 and in which finely distributed fog water droplets 50 are present in the air between the laser scanner 10 and the object 19 to be detected.

Both the received signal 38 of the orthogonal polarization component and the received signal 40 of the parallel polarization component of the reflected light 20 each have a pronounced maximum 42, 44 which is based in each case on a reflection of the transmitted light 14 at the object 19. The orthogonal received signal 38 has no further maxima or only weakly pronounced further maxima. In the parallel received signal 40, in contrast, a comparatively wide and flat maximum 46 is contained which is due to the reflection of the transmitted light 14 at the water droplets 50 of the fog. The detection of the object 19 actually to be detected can therefore be decisively disturbed by a correspondingly formed maximum 46, in particular in thick fog. This is in particular due to the fact that the maximum 44 is attenuated with respect to a situation without fog so that the object 19 is not recognized as such or that the maximum 46 is incorrectly classified as an object to be detected.

This difference between the two received signals 38, 40 is due to the fact that the laser light 14 is remitted at a solid object 19, i.e. is reflected with polarization components of all polarization directions (Lambert scattering), whereas on a reflection at soft object such as water droplets 50 the polarization of the transmitted light beam 14 is at least largely maintained (Mie scattering). The light reflected at water droplets 50 therefore does not contain any light portions, or hardly any light portions, which have a polarization which is oriented orthogonal to the polarization direction of the transmitted light 14. The orthogonal received signal 38 therefore has no interference signal corresponding to the maximum 46 of the parallel received signal 40.

Since the orthogonal received signal 38 does not have the interference signal 46 caused by the fog 50 or by other similar visibility-obstructing external phenomena, a secure object detection can be carried out only with reference to the orthogonal received signal 38.

In another variant, the two detected received signals 38, 40 can, however, also be compared with one another. The comparison can take place such that, on the evaluation whether an object 19 was detected by the transmitted light 14, the two received signal curves 38, 40 are added in regions in which they each have a finally common maximum 42, 44 and the parallel received signal 40 is ignored in regions in which a maximum 46 is only contained in the parallel received signal 40.

It can in particular be recognized from a comparison of the two received signals 38, 40 that fog is present at all since the interference signal 46 due to the fog 50 only occurs in one of the two received signal curves 38, 40. It can in particular be recognized with reference to the level of the maximum 46 how thick the fog 40 is, i.e. therefore how strong the visibility impairment is. The recognition and evaluation of the visibility impairment takes place by the evaluation unit 32. Since generally the degree of visual impairment can be determined, a safety signal can be output via the line 33 at the output when a predefined minimal visual range is fallen below.

It can generally also be determined solely from the parallel received signal curve 40 whether an object 19 was detected. For example, a conclusion can be drawn with reference to the flank gradient that the associated reflection at an object 19 is taking place since only an object 19 shows such a steep flank. Optionally, alternatively or additionally, the maximum value of the reflection of the object 19 can also be compared with the maximum value of the fog reflection 46 and a distinction between a reflection at an object 19 and at fog 50 can be derived from this. This in particular applies when it is taken into account that a reflection at an object 19 as a rule always occur at the end of a received signal curve.

In accordance with another embodiment, circularly polarized light can also be used. For example, a linearly polarized transmitted light beam transmitted by the light transmitter can be converted into circularly polarized light by means of a $\lambda/4$ waveplate of the laser scanner. On reflection at fog, the polarization direction of the circularly polarized light transmitted by the laser scanner is then rotated, i.e. from left-handed circularly polarized to right-handed circularly polarized or vice versa. After another passage through the $\lambda/4$ waveplate, the reflected light then has a linear polarization whose direction is oriented orthogonal to the linear polarization direction of the transmitted light beam transmitted by the light transmitter.

Objects present in the monitored zone of the laser scanner can be reliably recognized in outdoor applications by the present invention and simultaneously the presence and optionally the degree of a visibility impairment, for example of fog, or a fog thickness, can be recognized.

REFERENCE NUMERAL LIST

10 laser scanner
12 light transmitter
14 transmitted light beam
16 light deflection unit
18 monitored zone
19 object
20 reflected light
22 optical receiving system
24 light receiver
26 motor
28 rotating mirror
30 encoder
32 evaluation unit
33 line
34 housing
36 front screen
38 orthogonally oriented received signal
40 parallel oriented received signal
42 maximum
44 maximum
46 interference signal
48 polarization beam splitter
50 fog droplets

The invention claimed is:

1. A laser scanner (10) in accordance with the operating principle of the time of flight process for detecting objects (19) in a monitored zone (18), comprising:
    a light transmission unit having at least one light transmitter (12) for transmitting a polarized transmitted light beam (14) which comprises individual light pulses into the monitored zone (19);
    a light reception unit (24, 48) having at least one light receiver (24) for detecting the polarization component of the light (20) reflected in the monitored zone (19) which is orthogonal to the polarization direction of the transmitted light beam (14) and for generating a received signal curve (38) corresponding to the detected orthogonal polarization component; and
    an evaluation unit (32) which is configured to evaluate the time curve of the received signal curve (38) of the detected orthogonal polarization component of the respective individual light pulse and to carry out the object detection only based on the received signal curve (38) of the detected orthogonal polarization component.

2. The laser scanner in accordance with claim 1 configured as a safety laser scanner.

3. The laser scanner in accordance with claim 1, wherein the light reception unit (24, 48) comprises a polarization filter which is arranged in front of the at least one light receiver (24) in the propagation direction of the reflected light (20) and which is aligned orthogonal to the polarization direction of the transmitted light beam (14).

4. The laser scanner in accordance with claim 1, wherein the evaluation unit (32) is configured to evaluate the two curves (38, 40) together.

5. The laser scanner in accordance with claim 4, wherein the evaluation unit (32) is configured to compare the received signal curve (38) with a received signal curve (40) corresponding to the detected parallel polarization component.

6. The laser scanner in accordance with claim 1, wherein the light reception unit (24, 48) comprises a polarization beam splitter (48) which is arranged in front of the at least one light receiver (24) in the propagation direction of the reflected light (20) and which splits the reflected light (20) into the orthogonal polarization component and a parallel polarization component.

7. The laser scanner in accordance with claim 1, wherein the light transmission unit comprises two light transmitters which are each configured to transmit a polarized transmitted light beam into the monitored zone (18).

8. The laser scanner in accordance with claim 7, wherein the polarization directions of the two transmitted light beams are aligned orthogonal to one another.

9. The laser scanner in accordance with claim 7, wherein the wavelength and/or the frequency spectrum of the two transmitted light beams is identical.

10. A method for detecting objects in a monitored zone comprising:
    transmitting a polarized transmitted light beam comprising individual light pulses into the monitored zone;
    detecting the polarization component of the light reflected from the monitored zone which is orthogonal to the polarization direction of the transmitted light beam and generating a received signal curve corresponding to the detected orthogonal polarization component is generated; and
    evaluating the time curve of the received signal curve of the detected orthogonal polarization component of the respective individual light pulse and the object detection is carried out only based on the received signal curve of the detected orthogonal polarization component.

11. A method for detecting objects in a monitored zone comprising:
    transmitting a polarized transmitted light beam comprising individual light pulses into the monitored zone, wherein
    the polarization component of the light reflected from the monitored zone which is orthogonal to the polarization direction of the transmitted light beam is detected and the polarization component of the light reflected in the monitored zone which is parallel to the polarization direction of the transmitted light beam is detected and a received signal curve corresponding to the detected orthogonal polarization component is generated and a received signal curve corresponding to the detected parallel polarization component is generated; and
    the time curve of the received signal curve of the detected orthogonal polarization component of the respective individual light pulse is evaluated and the time curve of the received signal curve of the detected parallel polarization component of the respective individual light pulse is evaluated and the two curves are evaluated together, wherein an interference signal in the received signal curve of the detected parallel polarization component caused by visibility impairment is suppressed.

12. A laser scanner (10) in accordance with the operating principle of the time of flight process for detecting objects (19) in a monitored zone (18), comprising:
    a light transmission unit having at least one light transmitter (12) for transmitting a polarized transmitted light beam (14) which comprises individual light pulses into the monitored zone (19);
    a light reception unit (24, 48) having at least one light receiver (24)) for detecting the polarization component of the light (20) reflected in the monitored zone (19) which is orthogonal to the polarization direction of the transmitted light beam (14) and for detecting the polarization component of the light (20) reflected in the monitored zone (19) which is parallel to the polarization direction of the transmitted light beam (14) and for generating a received signal curve (38) corresponding to the detected orthogonal polarization component and for generating a received signal curve (40) corresponding to the detected parallel polarization component; and
    an evaluation unit (32) which is configured to evaluate the time curve of the received signal curve (38) of the detected orthogonal polarization component of the respective individual light pulse and to evaluate the time curve of the received signal curve (40) of the detected parallel polarization component of the respective individual light pulse and to evaluate the two curves (38, 40) together, wherein an interference signal in the received signal curve (40) of the detected parallel polarization component caused by visibility impairment is suppressed.

13. The laser scanner in accordance with claim 12, wherein the evaluation unit (32) is configured to recognize different maxima (42, 44, 46) and/or different flank gradients in the curve of the received signal (40) of the parallel polarization component.

14. The laser scanner in accordance with claim 12, wherein the evaluation unit (32) is configured to recognize interference signals (46) caused by external phenomena (50) in the curve of the received signal curve (40) of the parallel polarization component and/or to recognize a visibility impairment.

15. The laser scanner in accordance with claim 12, wherein the evaluation unit (32) is configured to determine at least one of the following members of the group consisting of: a value for a light damping, a light absorption and a visual range in dependence on the evaluation of the curve of the received signal curve (40) of the parallel polarization component.

16. The laser scanner in accordance with claim 12, wherein the evaluation unit (32) is configured to set the luminous intensity of the transmitted light beam (14) in dependence on the evaluation of the curve of the received signal curve (40) of the parallel polarization component.

17. The laser scanner in accordance with claim 12, wherein the at least one light receiver (24) is configured as a spatially resolving light receiver and has two reception regions spatially separate from one another; and
    further comprising two separate light receivers to detect the orthogonal polarization component of the reflected light (20) and the parallel polarization component of the reflected light (20) independently of one another.

* * * * *